(12) United States Patent
Thompson et al.

(10) Patent No.: US 6,479,958 B1
(45) Date of Patent: Nov. 12, 2002

(54) ANTI-KICKBACK AND BREAKTHROUGH TORQUE CONTROL FOR POWER TOOL

(75) Inventors: Stephen S. Thompson, Cochranville, PA (US); Paul G. Huber, Phoenix; Falgun Patel, Abingdon, both of MA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 08/736,020

(22) Filed: Oct. 22, 1996

Related U.S. Application Data

(63) Continuation of application No. 08/369,358, filed on Jan. 6, 1995, now abandoned.

(51) Int. Cl.[7] ............................................. H02P 7/29
(52) U.S. Cl. ..................... 318/430; 318/433; 388/937
(58) Field of Search ................... 318/430, 432, 318/433, 434, 630, 431; 388/937

(56) References Cited

U.S. PATENT DOCUMENTS

| | | | |
|---|---|---|---|
| 3,564,372 A | | 2/1971 | Vogelsberg et al. |
| 3,720,135 A | * | 3/1973 | Merner et al. |
| 3,920,088 A | * | 11/1975 | Dudek |
| 3,926,264 A | * | 12/1975 | Bardwell et al. |
| 3,962,910 A | * | 6/1976 | Spyridakis et al. |
| 4,066,942 A | * | 1/1978 | Bardwell et al. |
| 4,104,778 A | * | 8/1978 | Vliet |
| 4,249,117 A | | 2/1981 | Leukhardt et al. |
| 4,267,914 A | | 5/1981 | Saar |
| 4,273,198 A | | 6/1981 | Doniwa |
| 4,893,067 A | | 1/1990 | Bhagwat et al. |
| 5,014,793 A | | 5/1991 | Germanton et al. |
| 5,077,824 A | | 12/1991 | Nagata et al. |
| 5,154,242 A | | 10/1992 | Soshin et al. |
| 5,166,585 A | | 11/1992 | Koharagi et al. |
| 5,285,857 A | | 2/1994 | Shimada |
| 5,440,215 A | * | 8/1995 | Gilmore ..................... 318/432 |

FOREIGN PATENT DOCUMENTS

| | | |
|---|---|---|
| DE | 3230642 | 2/1984 |
| EP | 0291215 | 11/1988 |
| EP | 0340999 | 11/1989 |
| GB | 2269025 | 1/1994 |

* cited by examiner

*Primary Examiner*—Bentsu Ro
(74) *Attorney, Agent, or Firm*—Harness, Dickey & Pierce, P.L.C.

(57) ABSTRACT

A rapid increase in motor current (di/dt above a predetermined threshold) causes the motor control system to enter pulse mode operation in-which the motor current is pulsed on and off rapidly to dislodge the workpiece obstruction or binding condition that would otherwise lead to a motor stall. When the workpiece obstruction or binding has been cleared, the motor resumes normal operation.

2 Claims, 6 Drawing Sheets

ANTI-KICKBACK AND BREAKTHROUGH TORQUE CONTROL FOR POWER TOOL

This is a continuation of U.S. patent application Ser. No. 08/369,358, filed Jan. 6, 1995 now abandoned.

BACKGROUND AND SUMMARY OF THE INVENTION

The present invention relates to electrically driven power tools. In particular, the invention relates to a motor control circuit and method for detecting and responding to the onset of stall conditions (e.g., kickback or breakthrough conditions) by pulsing the motor to overcome the stall condition, if possible.

Electrical power tools typically employ a motor that imparts torque to the tool through a spindle. In the case of an electric drill, the motor spindle is coupled through a series of reducing gears to the chuck, which in turn holds the drill bit or other cutting or abrading tool, such as a hole saw, a grinding wheel, or the like. Power screwdrivers work on a similar principle, with the chuck holding a screwdriver bit. In both cases, the function of the reducing gears or gear train is to reduce the rotational speed of the tool while increasing the rotational torque.

Power routers are somewhat different. The cutting tool (router bit) of the typical hand-held router is typically direct-coupled to the spindle of the motor. In this case, the full rotational speed or RPM of the motor is used without gear reduction, to rotate the router bit at high speed. Reciprocating saws and jigsaws use yet another type of gear train that translates the rotational movement of the motor spindle to reciprocating movement.

Generally speaking, all of these power tools may suddenly encounter impending stall conditions at which time the output torque rapidly rises because of local changes in workpiece hardness, workpiece binding or jamming, tool obstruction from burrs and so forth. If the cause of the condition is not overcome, the tool may jam and the motor will stall. When drilling a hole with a power drill, for example, some workpieces will develop burrs on the tool exit side of the workpiece, and these burrs can engage the flutes of the drill bit, causing a rapid increase in torque as the drill bit tries to break free. In some instances, especially with metal workpieces, the burrs may actually stop drill bit rotation, causing a strong reaction torque that is imparted to the tool operator as the motor turns the tool in the operator's hand (instead of turning the drill bit).

A related phenomenon occurs with power saws. Referred to as kickback, the cutting movement of the saw blade may become partially or fully arrested by the workpiece, often when the saw cut is approaching completion and the unsupported workpiece becomes jammed against the saw blade. With the movement of the saw blade impeded, a large motor torque is generated and, in some case, the motor may actually stall.

These conditions are hereinafter generically referred to as "kickback" or "stall" conditions, regardless of the particular power tool involved or the specific circumstance which gives rise to the impending kickback or stall condition.

In the past, the Applicant's assignee developed anti-kickback power tool control techniques that sensed an impending kickback condition and inhibited the coupling of power to the tool, and/or optionally applied a brake to the tool, in response to the impending kickback condition. These systems are described more fully in U.S. Pat. No. 4,267,914 to Saar, entitled "Anti-Kickback Power Tool Control," issued May 19, 1981; and in U.S. Pat. No. 4,249,117 to Leukhardt et al., entitled "Anti-Kickback Power Tool Control," issued Feb. 3, 1981. The anti-kickback control systems described in these patents are designed to interrupt power to the motor once the impending kickback condition occurs. In order for power to once again be coupled to the tool, the trigger switch must be fully released and then again retracted, or some other signal provided by the operator.

Although the systems described in these patents are effective in detecting and preventing a kickback condition, the response of the control circuits disclosed therein to the impending kickback condition may hamper the operator's ability to complete the desired task. For example, if power has been interrupted due to a drill bit binding on a burr formed during breakthrough, it may be difficult for the operator to break the burr free to complete the hole without repeating the stall condition and causing re-interruption of power to the motor. Consequently, an improved control technique is needed that is not only effective in detecting and preventing a kickback condition, but is also effective in enabling the operator to possibly overcome the impediment and completing the intended task.

The present invention represents an improvement to Applicant's prior anti-kickback technology. Instead of responding to an impending kickback condition by simply interrupting power to the tool (and/or applying a brake), the present invention effects a motor pulsing operation that, in many cases, can actually resolve or clear the breakthrough or kickback condition, so that the tool does not need to be shut down and restarted. When the invention is used with power drills, for example, the operator can keep the trigger switch actuated while the present controller senses an impending stall condition (e.g., kickback or breakthrough condition) and responds to that condition by pulsing the motor for a predetermined time period to deliver a series of torque pulses. These torque pulses each have a peak torque that is substantially greater than the average torque delivered during the series of pulses. The impact of these torque pulses may allow the tool to break through the burrs or workpiece restrictions that are causing the impending stall or kickback condition. In one embodiment, the pulses are delivered in a sequence designed to be harmonically related to the natural frequency of the gear train of the power tool. This provides even greater peak torque output by causing the gear train to oscillate between an energized state and a relaxed state at the gear train's natural frequency.

The present invention can be used with virtually any power-driven tool. When incorporated into the motor control of a rotary saw, the motor pulsing effect may cause the workpiece to become unjammed or break through the binding condition that originally caused the impending stall or kickback.

Accordingly, the present invention provides a method and apparatus for controlling virtually any power tool having a motor that imparts torque to an output spindle when actuated by an operator actuable switch. The method involves sensing a motor parameter indicative of the onset of a stall condition. The sensed parameter can be motor current, for example, and the onset of stall can be inferred by monitoring the rate of change in motor current with respect to time. While the trigger switch remains actuated, the motor is pulsed for a predetermined period to deliver a series of torque pulses each having a peak torque substantially greater than the average torque delivered during the series of torque pulses. In many cases, these torque pulses will clear the condition that caused the impending stall. If so, then normal motor operation is resumed. If not, then the power to the motor is removed after a predetermined time to avoid burnout of the motor.

For a more complete understanding of the invention, its objects and advantages, reference is made to the following specification and to the accompanying drawings.

DESCRIPTION OF THE PREFERRED EMBODIMENT

The present invention is useful with a wide range of different power tools. To explain the principles of the invention, a power drill will be illustrated and described. It will be readily apparent that the invention can be incorporated into other types of electrical power tools, as well.

Figure 1:
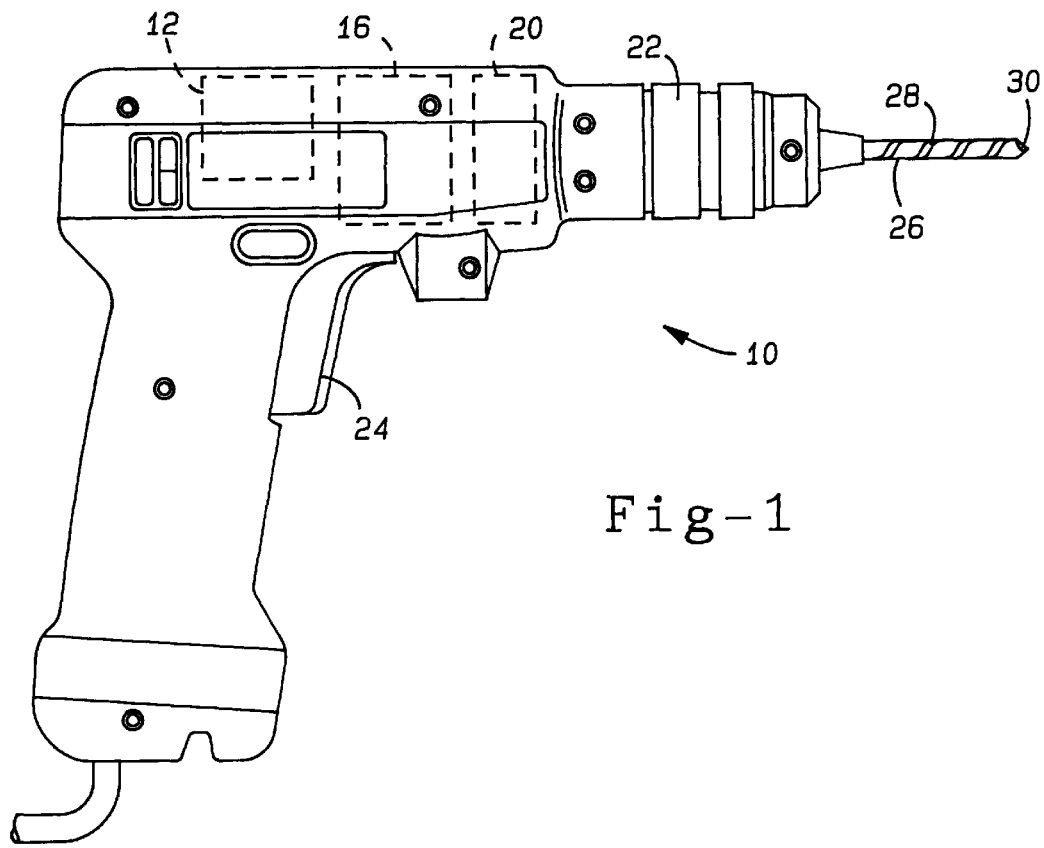
FIG. 1 is an elevational side view of a typical variable speed power drill with which the control circuit of the invention may be used.

Referring to FIG. 1, a power drill is depicted generally at 10. The drill incorporates a control circuit 12 in accordance with preferred embodiments of the present invention. The drill 10 includes, in conventional fashion, a motor 16, a gear train 20, and a tool bit-receiving chuck 22. A trigger switch 24 controls the application of current to the motor and may also be used to vary the speed of the motor to suit various work needs. A drill bit 26 may be installed in the chuck, as illustrated. The drill bit has a fluted shank 28 and a cutting tip 30 of conventional configuration.

Figure 2:
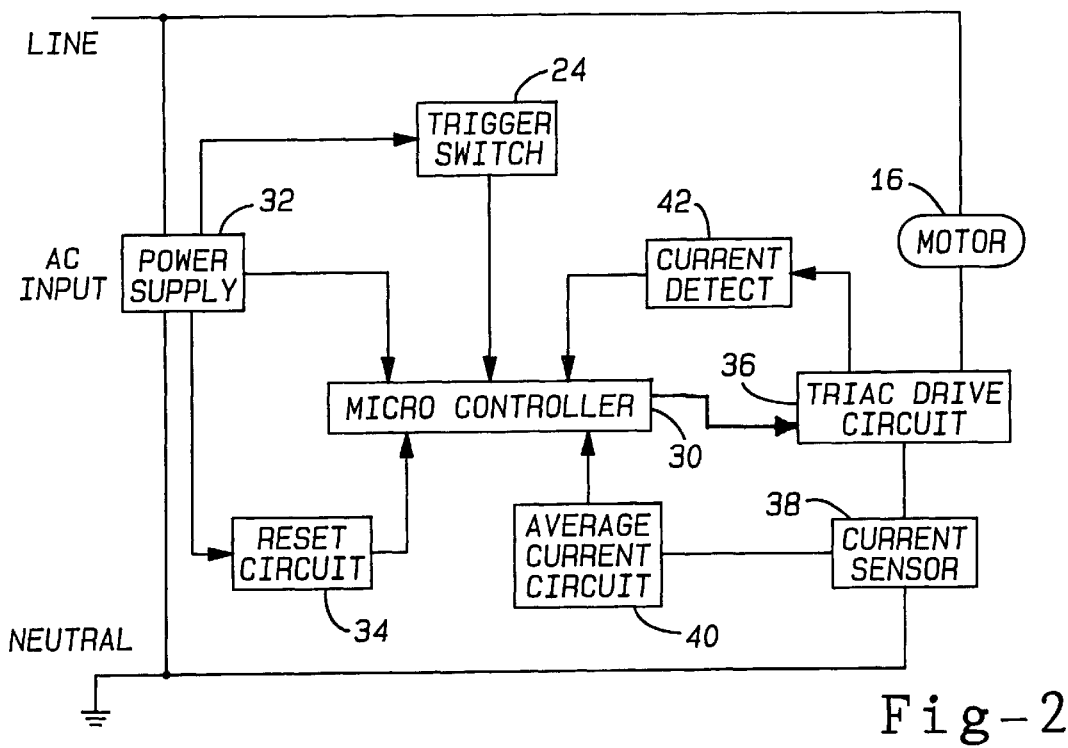
FIG. 2 is a simplified block diagram of a preferred embodiment of the control circuit of the present invention.

Referring to FIG. 2, a block diagram of a preferred embodiment of the control circuit 12 is illustrated. The control circuit 12 supplies current to motor 16 for both normal (continuous) operation and also for pulse mode operation in accordance with the invention.

Control circuit 12 includes a microcontroller 30 in the form of a microprocessor or microcomputer. A power supply circuit 32 is coupled to the AC power line input and supplies suitable DC voltage to operate microcontroller 30. As illustrated, the trigger switch 24 supplies a trigger signal to microcontroller 30. This trigger signal indicates the position or setting of the trigger switch as it is manually operated by the tool operator. If desired, microcontroller 30 can include a reset circuit 34 which, when activated, causes the microcontroller to be re-initialized.

Drive current for operating motor 16 is controlled by a triac drive circuit 36. The triac drive circuit is, in turn, controlled by a signal supplied by microcontroller 30. A current sensor 38 is connected in series with motor 16 and triac drive circuit 36. Current sensor 38 may be, for example, a low resistance, high wattage resistor. The voltage drop across current sensor 38 is measured as an indication of actual instantaneous motor current. The instantaneous motor current, so measured, is supplied to an average current measuring circuit 40, which in turn supplies the average current of value to microcontroller 30. Microcontroller 30 uses the average current to evaluate whether to switch into and out of pulse mode operation. In addition to average current, microcontroller 30 is also supplied with a signal from current detector circuit 42. This circuit is coupled to the triac drive circuit 36 and supplies a signal indicative of the conductive state of the triac drive circuit. If for some reason the triac does not turn on in response to the control signal from microcontroller 30, circuit 42 detects this and notifies the microcontroller so another control signal pulse can be sent by the microcontroller. Specifically, if the triac gate voltage is zero (triac not conducting), circuit 42 supplies an indication of this condition to the microcontroller.

In operation, the trigger switch 24 supplies the trigger signal to microcontroller 30 that varies in proportion to the switch setting. Based on this trigger signal, microcontroller 30 generates a control signal which causes the triac drive circuit to conduct, thereby allowing motor 16 to draw current. This motor current causes the motor to turn, the motor current being approximately proportional to the motor torque. The average current circuit 40 and current sensor 38 monitor the motor current and supply an average current signal to microcontroller 30. This average current signal is processed by microcontroller 30, as will be described below, to sense when an impending stall condition has developed. When an impending stall condition is detected, microcontroller 30 switches to a pulse mode operation, causing the triac drive circuit to supply rapid ON/OFF current pulses to motor 16. These current pulses deliver a series of torque pulses each having a peak torque substantially greater than the average torque delivered during pulse mode operation. In many cases, these torque pulses will clear the condition that caused the impending stall. If so, then microcontroller 30 senses this, by monitoring the average current signal, and reverts automatically to normal motor operation.

Figure 10:
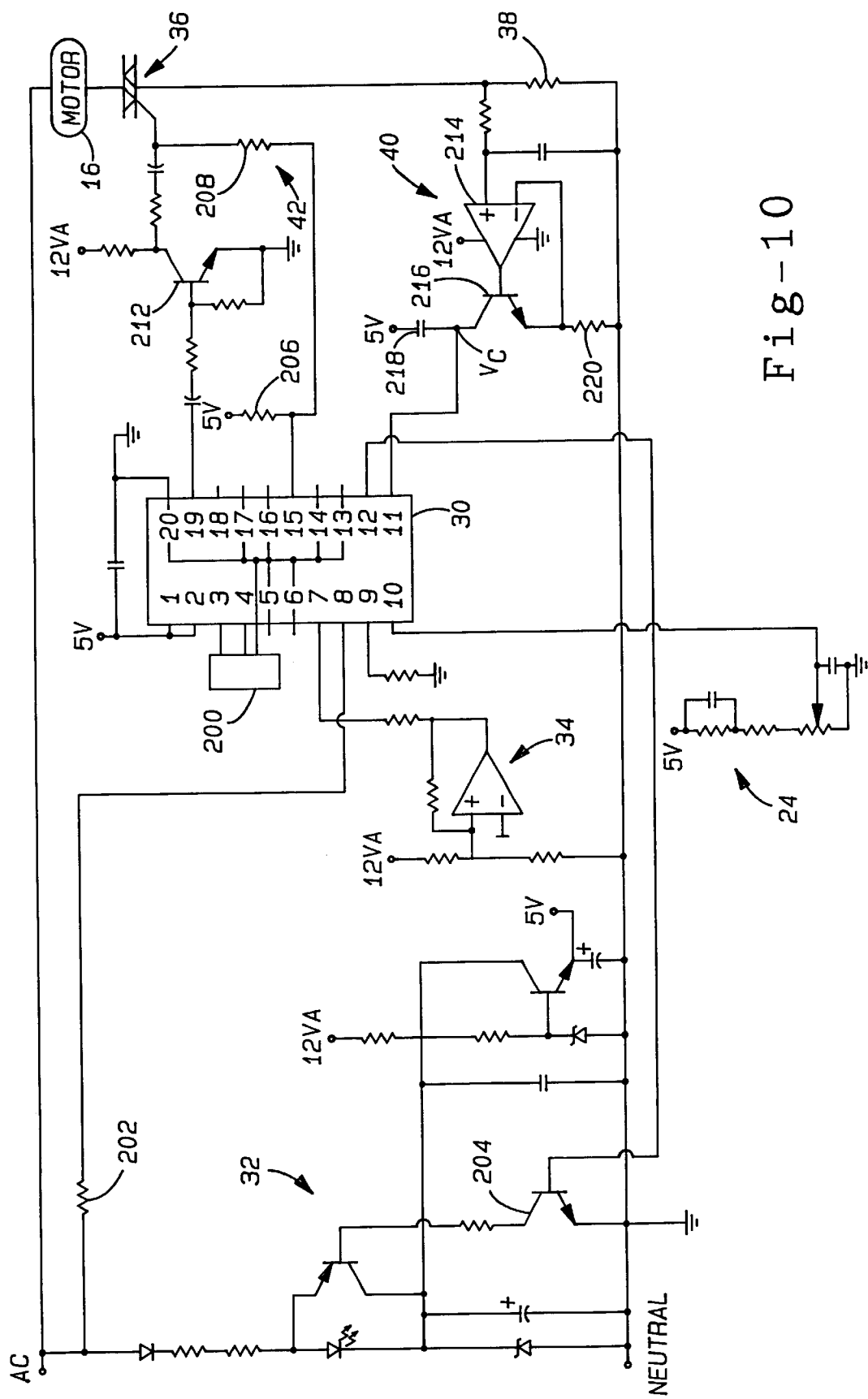
FIG. 10 is a detailed schematic diagram of a motor control circuit for a power drill incorporating the present invention.

The pulse mode operation of the invention can be implemented by a variety of different microprocessor-implemented procedures. Two procedures are described here: a first procedure illustrated in FIG. 3 and a second procedure illustrated in FIG. 5. A pseudocode routine illustrating the details of one possible pulse mode routine appears in the Appendix. By way of further illustration, a detailed schematic of a motor control circuit for an AC power drill is illustrated in FIG. 10 and described below.

Figure 3:
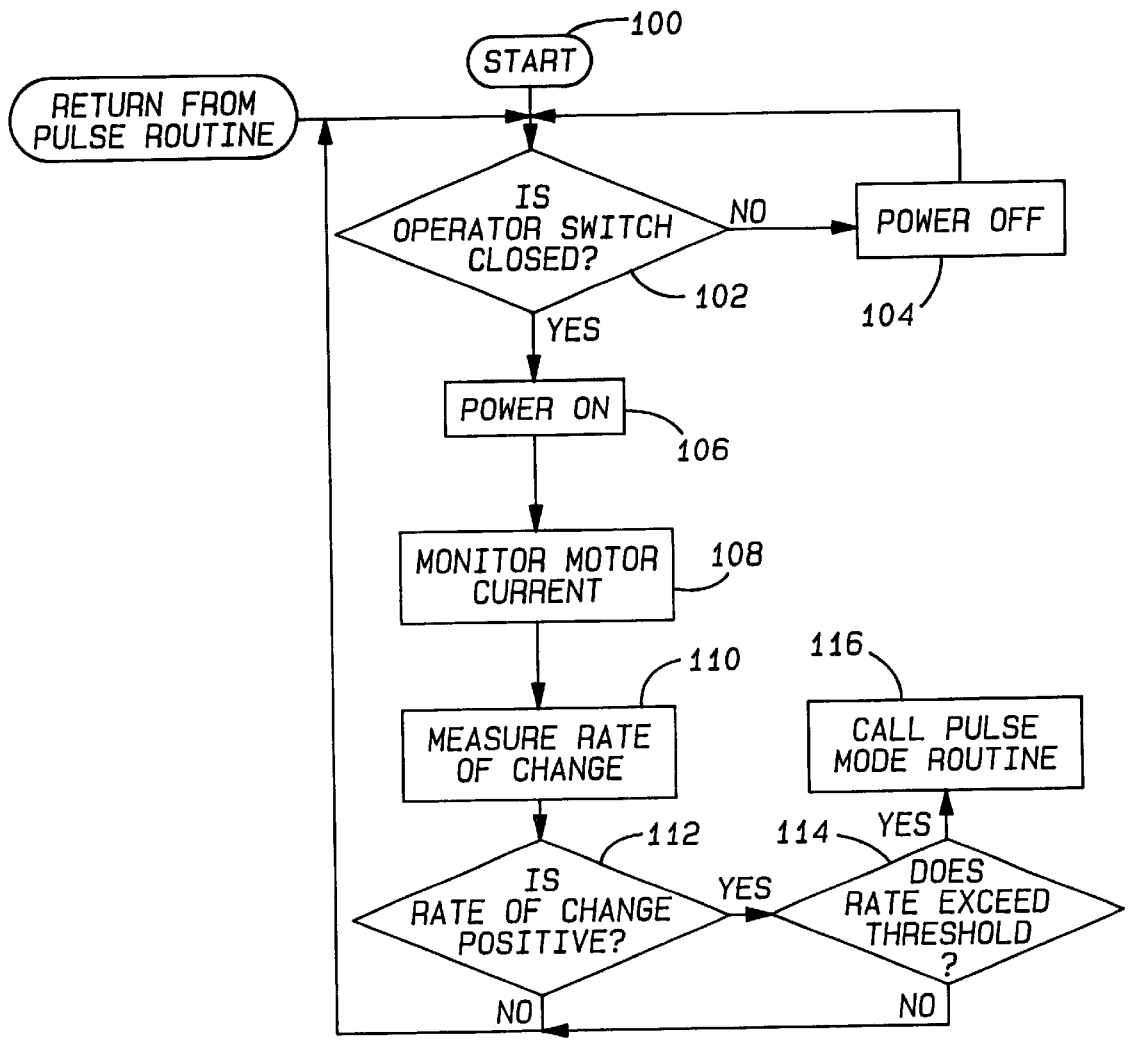
FIG. 3 is a flowchart illustrating one embodiment of the invention.

Referring to FIG. 3, a first motor control routine is illustrated. Beginning at start step 100, the routine first checks to see whether the operator switch is closed (step 102). The operator switch may be, for example, the manually actuated trigger switch 24 of a power drill. If the switch is not closed, then power to the motor is switched off (step 104) and control branches back to step 102. If the operator switch is closed, then power is supplied to the motor (step 106) and the motor will then draw current in proportion to the load placed on the motor by the tool. Motor current is monitored (step 108) and the rate of change in motor current is measured (step 110). If the rate of change in motor current is positive (step 112) and if the rate of change in motor current also exceeds a predetermined threshold (step 114), then the pulse routine is called (step.116). If the rate of change in motor current is not positive, or if the rate of change does not exceed the predetermined threshold, then control simply branches back to step 102.

Figure 4:
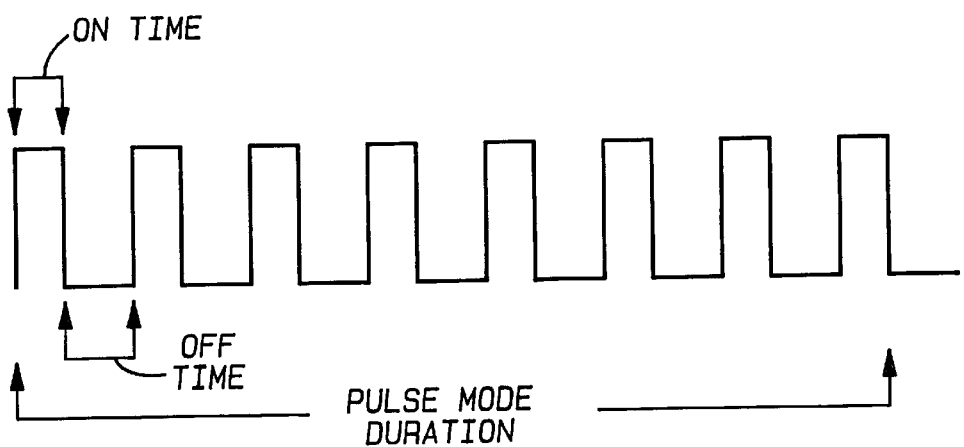
FIG. 4 is a pulse mode timing diagram useful in understanding the invention.

The pulse mode routine can be implemented by a variety of different microprocessor-implemented procedures. One such procedure is described in the pseudocode listing that appears in the Appendix. Referring to the pseudocode listing, the procedure defines a current ON time and a current OFF time. These are used to generate the motor current pulse waveform illustrated in FIG. 4. If desired, the ON time and OFF time can be of equal duration (a 50% duty cycle) or they may be of different durations. In some embodiments, the ON time and OFF time durations can be derived from the AC power line frequency. Alternatively, the ON time and OFF time durations can be generated by the onboard clock of the microcontroller 30. By suitably choosing the ON time and OFF time values, the frequency of the pulsating current signal can be established during system design.

Although the invention can be implemented with a variety of different ON time and OFF time combinations, some tool applications will benefit by selecting the ON time and OFF time to correspond to the natural resonant frequency of the tool gear train. Typically, there is a certain degree of play in a power tool gear train that allows the motor spindle to rotate between an energized position and a relaxed position when power is applied and removed, respectively. Like many physical systems, the motor and its gear train will exhibit a natural resonant frequency, namely the frequency at which oscillation between the energized state and the relaxed state most naturally occurs. If pulsating current is applied in synchronism with this natural frequency, then oscillation energy is enhanced. To illustrate the principle, consider how a basketball is dribbled by manually applying energy at or near the peak of each bounce in synchronism with the bouncing frequency. Energy is added at the proper time so that oscillation (bouncing) is enhanced. Energy can be added to the oscillating gear train system in much the same fashion.

The natural resonant frequency of the gear train of a power tool can be determined experimentally using the procedure described in the pseudocode of the Appendix. To find the natural resonant frequency, the microcomputer is programmed to iteratively select a range of different ON times and OFF times while the torque output of the tool is measured. Those ON time and OFF time values that correspond to the maximum torque output correspond to the natural resonant frequency of the gear train system (or in some cases, a harmonic thereof).

Referring to the pseudocode listing in the Appendix, the procedure also defines a pulse mode duration. Also shown in FIG. 4, the pulse mode duration is a predetermined time during which the pulse mode routine will operate if called upon. The presently preferred embodiment will terminate the pulse mode routine under certain conditions after the pulse mode duration has elapsed. Thus, if the stall condition is not relieved within the predefined pulse mode duration, the motor may be shut down to avoid burnout.

The procedure of the pseudocode Appendix also defines a current threshold at which the pulse mode routine may be terminated because the impending stall condition has been cleared.

The procedure begins by initializing the above values. Next, the pulse mode duration counter is started. The remainder of the routine is performed while the pulse mode duration counter has not elapsed.

The motor current is turned on for an interval dictated by the current ON time. This is accomplished by starting a current ON time counter and then turning on the motor current while the ON time counter is not elapsed. While the motor current is on, the current sensing system measures the average motor current. Preferably, the measure is made on a cycle-by-cycle basis, using the circuitry described above. If the average motor current is less than the initialized current threshold, then the motor pulse routine exits early. Also, if the operator opens the switch while the current ON time is not elapsed, the motor pulse routine exits.

After the ON time has elapsed, the OFF time is measured. The motor current is turned off and the OFF time counter is started. Until the OFF time elapses, the routine monitors to see if the operator has opened the switch. If so, the motor pulse routine exits. After the motor OFF time has elapsed, control branches back to the ON time segment of the procedure where by the cycle repeats until the pulse mode duration has elapsed.

When the pulse mode duration counter has elapsed, a condition that is reached only if the stall condition is not cleared, power to the motor is switched off, a brake may be applied, if desired, and the trigger switch is locked out until physically reset by the operator.

Figure 5:
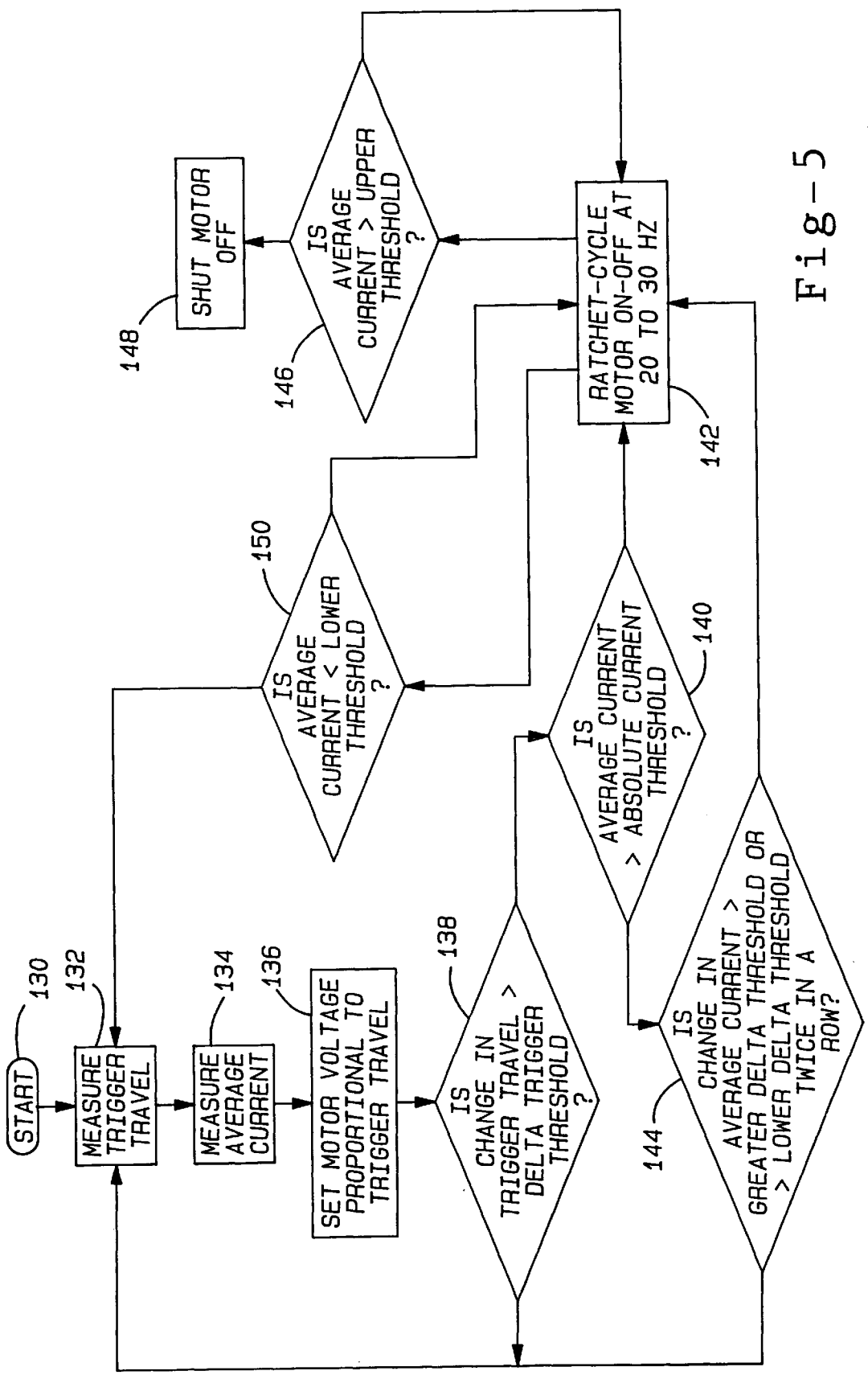
FIG. 5 is a flowchart illustrating another preferred embodiment of the invention.

Referring to FIG. 5, a second, presently preferred embodiment of the motor control routine is illustrated. Beginning at start step 130, the routine first measures the trigger travel in step 132 to determine the present setting of the trigger switch 24. Next (step 134), the average motor current is measured and the motor voltage is set proportional to the trigger travel (step 136). In this way, the motor is set to operate at a speed dictated by the trigger setting.

In the embodiment of FIG. 5, pulse mode operation is performed only when the change in trigger travel or movement is greater than a predetermined threshold. Thus, in step 138 the change in trigger travel is compared with a delta trigger threshold. If the change in trigger travel is not greater than the threshold, control simply loops back to step 132. Otherwise, control proceeds to step 140 where the absolute current is compared with an absolute current threshold. If the absolute current is above the threshold, pulse mode operation is begun (step 142). If not, then control proceeds to step 144 where the time rate of change in average current is analyzed. If the change in average current (di/dt) is greater than an upper threshold, or if the change in average current is greater than an intermediate threshold over two consecutive cycles, then pulse mode operation is commenced (step 142). If neither of these tests (step 144) are satisfied, control loops back to step 132.

The motor will continue in pulse mode operation until certain events occur. As illustrated in steps 146 and 148, if the average current is greater than an upper threshold during pulse mode operation, then the motor is shut off. Also, as illustrated in step 150, if the average current is less than a lower threshold, pulse mode operation is terminated and control loops back to step 132.

Figure 6:
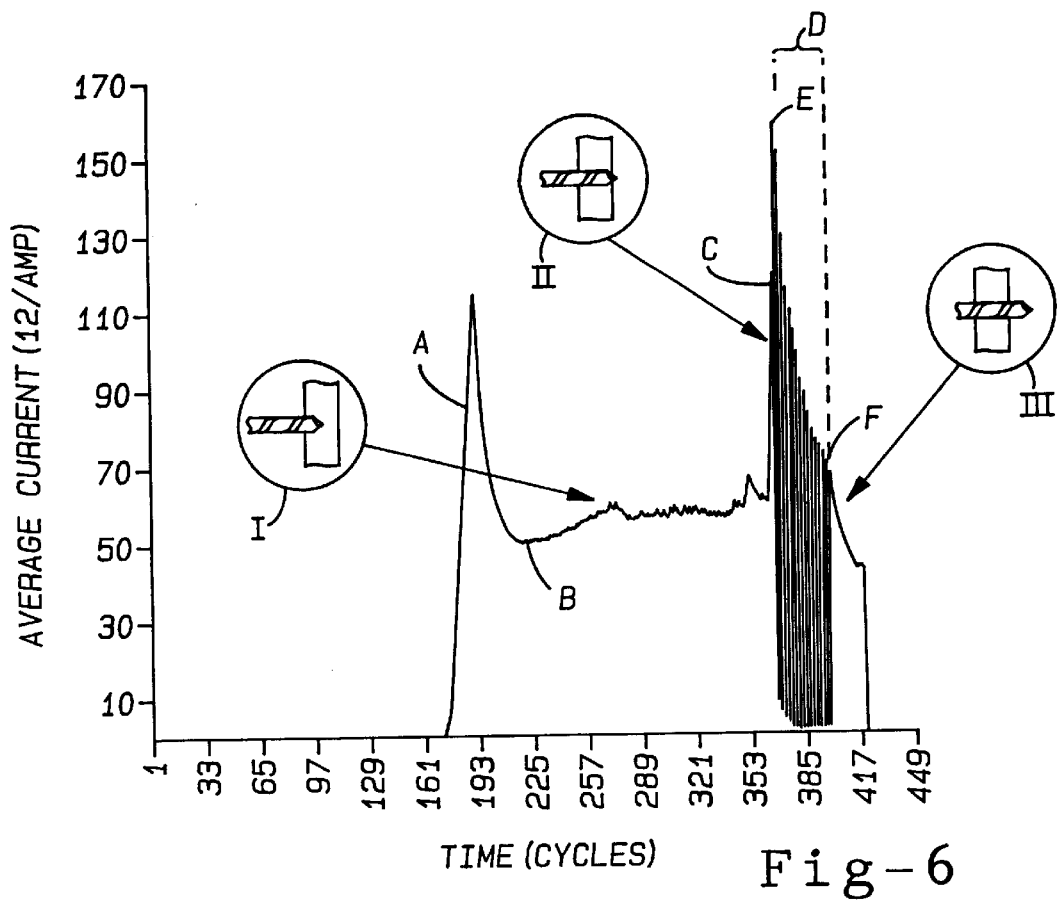
FIG. 6 is a graph of motor current as a function of time, illustrating how the motor is controlled in normal operation and in pulse mode operation.

By way of further illustration, FIG. 6 graphically depicts the motor current of a power drill equipped with the invention. Motor torque is proportional to motor current, hence the graphical depiction of FIG. 6 also illustrates how motor torque is controlled. When the tool is switched on, motor current rapidly rises, as at A, as the tool accelerates to full speed. Thereafter, the motor current settles down to a normal operating current, as at B. While the workpiece is being drilled, motor current may fluctuate up and down slightly due to changes in workpiece hardness and changes in operator-applied pressure. These minor variations aside, motor current is essentially constant as the drill bit works its way through the workpiece, as depicted in inset I of FIG. 6.

When breakthrough occurs, as illustrated in inset II, motor current rises rapidly, as at C. Specifically, the rate of change in motor current is more rapid than during initial acceleration, as at A. The reason for this rapid increase in motor current is that the hole at the exit side of the workpiece is not yet perfectly round and may have burrs or unremoved portions of material that become lodged in the flute portion of the drill bit.

When the rapid rise in motor current is sensed by the invention, the pulse mode routine is called and the motor current is thus pulsed, as depicted at D. Note that the peak motor current (and motor torque) achieved during this pulse mode operation is substantially greater than the average motor current (and average torque) during this interval. The peak motor current and peak torque is also substantially greater than the average torque during the normal drilling, as at B. Also note that the peak current attains a maximum value at E and thereafter diminishes with each successive peak. Ultimately, the peak current drops to the current threshold at F, whereupon normal (nonpulsed) operation is resumed.

During each pulse of the pulse mode operation, the drill bit cutting edge is driven to impact the burr or unremoved workpiece material in chisel-like fashion. After each impact, the gear train is allowed to relax, permitting the drill bit cutting edge to back off slightly for the next impact. In this way, the drill bit cutting edge effects a chopping motion and the peak torque developed during each chop is substantially greater than the average torque the motor is otherwise capable of providing. This pulsing action may allow the tool to break through any remaining burrs or other material obstructions. After breakthrough has occurred, the tool resumes normal operation so that the hole can be further cleaned out, as depicted by insert III. The pulsing also warns the operator that the above condition has occurred.

Notably, during this entire pulse mode operation, the trigger switch remains on, that is, activated by the tool operator. The system enters pulse mode operation automatically if a rapid rise in motor current dictates, and the operator can simply continue to hold the trigger switch closed while concentrating on the drilling or cutting operation.

If the pulse mode operation is not successful in overcoming the stall condition, then the motor will shut down after the predetermined pulse mode duration has elapsed.

Although the inset views I–III of FIG. 6 have illustrated a drill bit, the invention is also useful with other types of power tools, as discussed above. In the case of a power saw, a potential stall condition can occur after the cut has been completed and a portion of the removed material becomes jammed between the saw blade and rip fence or other guide. The pulsating action of pulse mode operation will frequently vibrate the workpiece free of the jam and will also warn the operator of the condition. Thus, the present invention can be incorporated into a wide variety of power tools, including drills and saws.

Figure 7:
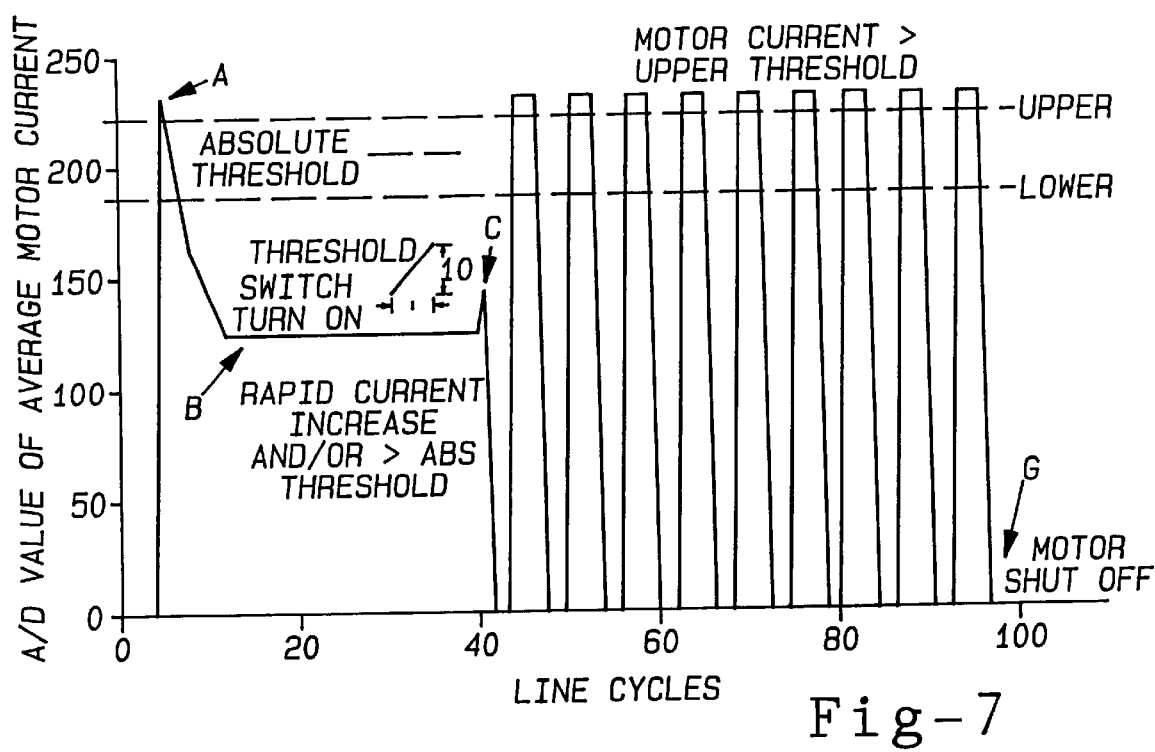
FIGS. 7, 8 and 9 are graphs of motor current (digital values) as a function of time (line cycles), useful in understanding the invention in operation.
Figure 8:
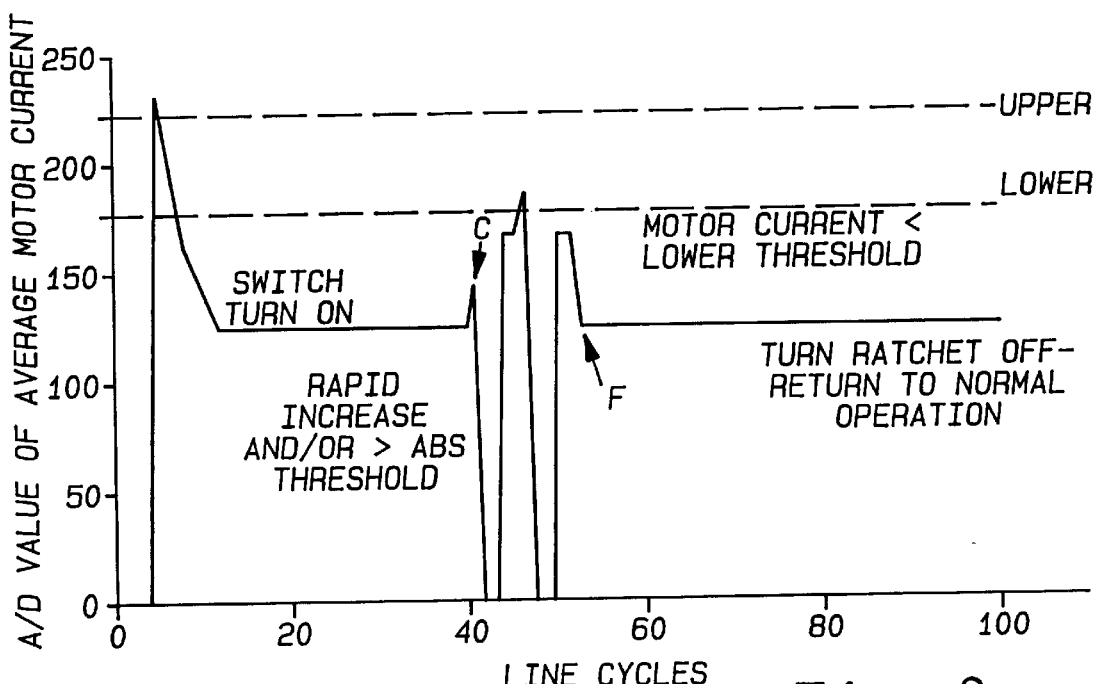
Figure 9:
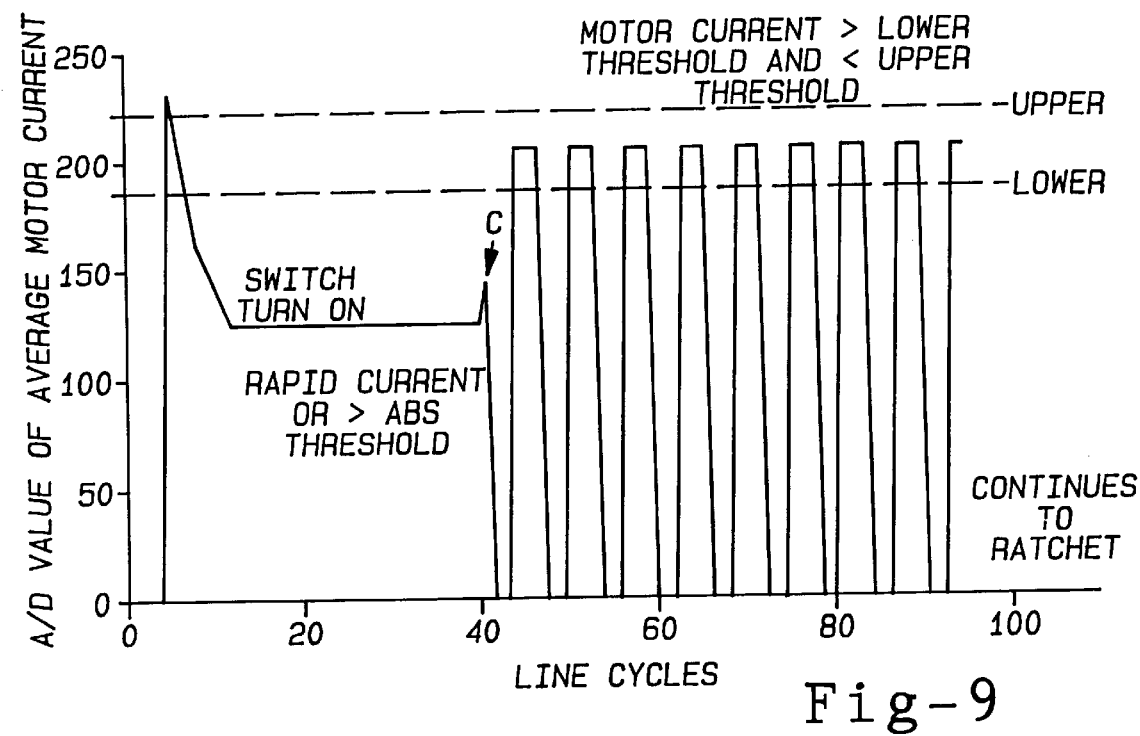

To further understand the motor control routine of FIG. 5, refer to FIGS. 7, 8 and 9. These Figures show average motor current (the A/D value generated by the analog-to-digital conversion circuitry of microcontroller 30) as a function of time (measured in line cycles).

The preferred embodiment of FIG. 5 performs pulse mode operation in synchronism with the AC line frequency. In the pseudocode listing in the Appendix, a more generalized case is illustrated in which pulse mode operation is not necessarily synchronized to the line frequency. In the pseudocode listing, the ON and OFF times may be any value measured by the microprocessor's clock circuitry. In the embodiment illustrated in FIGS. 7–9, the ON and OFF times are measured by counting a predetermined number of AC line cycles instead of using the clock circuitry of the microprocessor. For AC powered tools, the embodiment of FIGS. 7–9 is preferred. For DC powered tools, such as cordless battery powered tools, a microprocessor clock-based embodiment may be employed.

FIG. 7 gives a first example of the system of FIG. 5 in operation. After the switch is turned on, as at A, the average motor current settles down to a stable operating value, as at B. This current is indicative of normal tool operation with no impending stall condition. At C, the current rises rapidly, indicating an impending stall condition. As described in FIG. 5, the impending stall condition occurs when one of two conditions are satisfied.

Condition 1: The average motor current rise as a function of time is greater than a predetermined delta threshold. FIG. 7 illustrates this delta threshold as a rate of change or first derivative value corresponding to a predetermined rate of current rise or slope.

Condition 2: The average motor current exceeds an absolute threshold. FIG. 7 illustrates the absolute threshold as any current above the lower threshold shown. Once one of these two conditions has been met (in this case, the first condition), pulse mode operation is commenced. If the cause of the impending stall condition is not cleared after a predetermined time (after a predetermined number of line cycles), the motor is shut off, as at G. Shutoff occurs in this case because the average current peaks exceed the upper threshold.

FIG. 8 illustrates the case where motor current enters the pulse mode operation, as at C, and then returns to normal operation, as at F. Normal operation is resumed because the motor current has fallen below the lower threshold.

FIG. 9 illustrates the case in which pulse mode operation is begun, as at C, and continues in this mode without invoking motor shutoff. The peak motor current in pulse mode operation falls below the upper current threshold. Because the upper threshold is not reached, pulse mode operation will continue. Comparing FIG. 9 with FIG. 7, note that in FIG. 7 the average current peaks exceed the upper threshold during pulse mode operation. Thus, in FIG. 7 the pulse mode operation terminates and the motor is shut off at G, whereas in FIG. 9 pulse mode does not terminate.

FIG. 10 shows how the invention may be implemented in an AC powered drill. Groups of components in the embodiment of FIG. 10 correspond to the block diagram elements of FIG. 2. Accordingly, refer to FIG. 2 for an overview of these circuit component functions. Referring to FIG. 10, the presently preferred power supply circuit 32 uses zener diodes to supply low voltage power supply voltages to various parts of the circuit, including a 5 volt DC supply and a 12 volt DC supply.

The circuit of FIG. 10 can be constructed using an ST6210A microcontroller circuit connected according to the pin-out illustrated. A resonator 200 maintains the proper clock frequency of the microcontroller. The trigger switch circuit 24 is connected to A/D input pin 10 of microcontroller 30. Microcontroller 30 is thus able to monitor the setting of the trigger switch. The AC line frequency is supplied to microcontroller 30 through sensing resistor 202 coupled to high impedance input pin 8. This provides microcontroller 30 with a signal from which the AC line frequency can be obtained for synchronizing and for generating the time base that controls the rate of pulse mode operation.

Under certain conditions, microcontroller 30 will shut off the power to the LED for purposes of optical indication. Microcontroller 30 supplies a signal on pin 12 that is applied to the base of transistor 204 for this purpose. So that microcontroller 30 can monitor the state of the triac drive circuit, pin 15 is coupled through pull-up resistor 206 to the 5 volt supply. Pin 15 is also coupled through resistor 208 to the trigger terminal of triac 36. Depending on the state of the triac, pin 15 of microcontroller 30 may be pulled low, thereby signaling a change in state of the triac drive circuit.

Microcontroller 30 controls the operation of triac drive circuit 36 through pin 19. Pin 19 is coupled to the base of triac drive circuit transistor 212. A variable duty cycle alternating signal is applied to transistor 212, which in turn operates the triac. Note that the triac is preferably coupled in the neutral side of the motor circuit, as illustrated.

As the motor operates, motor current passes through current sensing resistor 38. The current sensing resistor can be a high wattage, low resistance (0.01 ohms) device. The voltage drop across resistor 38 is measured by average current monitoring circuit 40. The output of circuit 40 is supplied to the A/D input pin 11 of microcontroller 30. This signal is used to determine when to switch into and out of pulse mode operation and also when to shut down power to the motor.

The presently preferred average current monitoring circuit 40 performs a cycle-by-cycle average current measurement. Operational amplifier 214 mirrors the voltage drop measured across current sensing resistor 38. This mirrored voltage is applied to the base of transistor 216, which draws current through capacitor 218 in order to maintain the voltage established by transistor 216 and the value of resistor 220. The cycle-by-cycle motor current $i_{ave}$ may be calculated from the voltage $V_c$ on capacitor 218 using the following formula, where $R_s$ is the resistance of resistor 38, $R_i$ is the resistance of resistor 220, and T is the period of the AC line current (e.g., 10 msec).

$$i_{ave} = \frac{R_i}{R_s} \frac{C}{T} \times Vc$$

The voltage Vc on capacitor 218 is supplied to the A/D input pin 11 through resistor 221. Once the A/D conversion by the microcontroller is complete, pin 11 is set to the output high conditions, discharging capacitor 218 through resistor 221 for the purpose of resetting the cycle-by-cycle average current circuit to receive the next positive half cycle of current. Resetting the circuit enables the system to measure the average current of the motor with a line cycle response time, which is critical when accurately and instantaneously detecting rapid increases in motor current.

From the foregoing, it will be understood that the present invention provides a motor control circuit and method that may be incorporated into a wide variety of different power tools to sense and, in some cases, overcome an impending stall condition. Equipped with the invention, power tools become easier and more convenient to operate, as the operator can concentrate on making an accurate drill or cut without worrying about stall conditions such as breakthrough seizing and kickback conditions. As a further advantage, when an impending stall condition does occur, the pulsating action of the invention delivers bursts of torque so that the stall condition can be overcome, but the operator does not feel this torque because the average torque remains low. The pulsing action, however, acts as warning to the operator that a potential stall condition exists. Thus, power tools equipped with the invention have less tendency to twist in the operator's hand.

While the invention has been described in its presently preferred embodiments, it will be understood that the invention is capable of certain modification without departing from the spirit of the invention as set forth in the appended claims. For example, while the invention has been disclosed primarily in an AC-powered drill application, the invention is equally suitable to battery powered tools.

APPENDIX

Pulse Mode Routine

Initialize current ON time
Initialize current OFF time
Initialize pulse mode duration
Initialize current threshold
Start pulse mode duration counter
While pulse mode duration is not elapsed
Begin
    ; [pulse motor on for ON time]
    Start current ON time counter
    While current ON time is not elapsed:
        turn on current
        measure average motor current
        if average motor current is less than current threshold
            exit motor pulse routine ; [exit early if stall is relieved]
        else
        if switch open
            exit motor pulse routine ; [exit early if switch opened]
        else
    End While
    ; [pulse motor off for OFF time]
    turn off current
    Start current OFF time counter
    While current OFF time counter is not elapsed
        if switch open
            exit motor pulse routine ; [exit early if switch opened]
    End While
; [repeat the above until pulse mode duration has elapsed]
    turn off motor power
    lockout trigger switch (until physically reset)
End

What is claimed is:

1. A method of controlling a power tool having a motor that imparts torque to an output spindle when actuated by an operator actuable switch, the power tool having a characteristic natural resonant frequency, comprising:
    sensing a motor parameter indicative of the onset of an impending stall condition; and
    in response to the sensed onset of an impending stall condition and while the switch remains actuated, pulsing the motor a plurality of times at a frequency substantially harmonically related to said natural resonant frequency to deliver a series of torque pulses having peak torque substantially greater than the average torque delivered during the series.

2. A motor control circuit for an electric power tool having a characteristic natural resonant frequency, comprising:
    drive circuit coupled to said motor for controlling the application of current to said motor;
    a processor coupled to said drive circuit and providing a processor output signal for controlling said drive circuit;
    a current sensor coupled to said drive circuit for sensing a parameter indicative of motor current and coupled to said processor for providing first processor input signal;
    said processor having first means for detecting when the rate of change in the value of said first processor input signal exceeds a predetermined limit for detecting the onset of a stall condition;
    said processor further having second means for using said processor output signal to apply current pulses to said motor at a frequency that is substantially harmonically related to said natural resonant frequency in response to the detected onset of a stall condition.

\* \* \* \* \*